J. MAZZACCO.
LEVELING AND MEASURING INSTRUMENT.
APPLICATION FILED JULY 22, 1918.
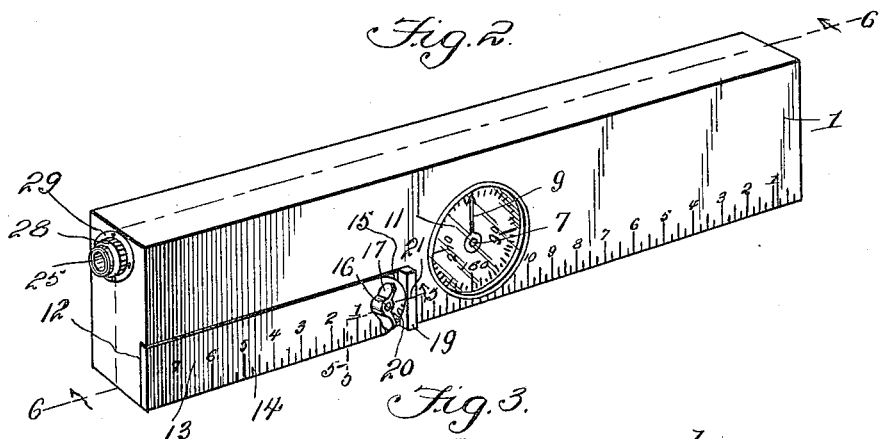
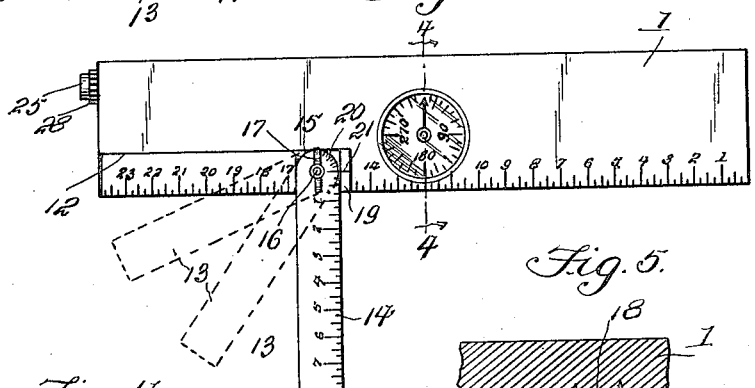
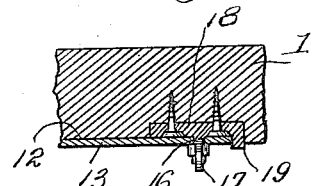
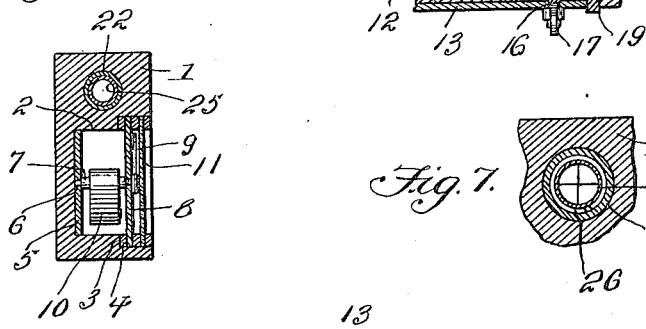
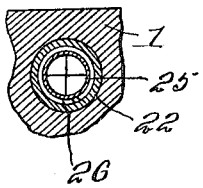
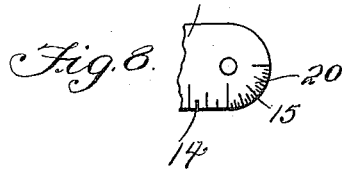
Inventor
James Mazzacco
By Victor J. Evans
Attorney
Witnesses

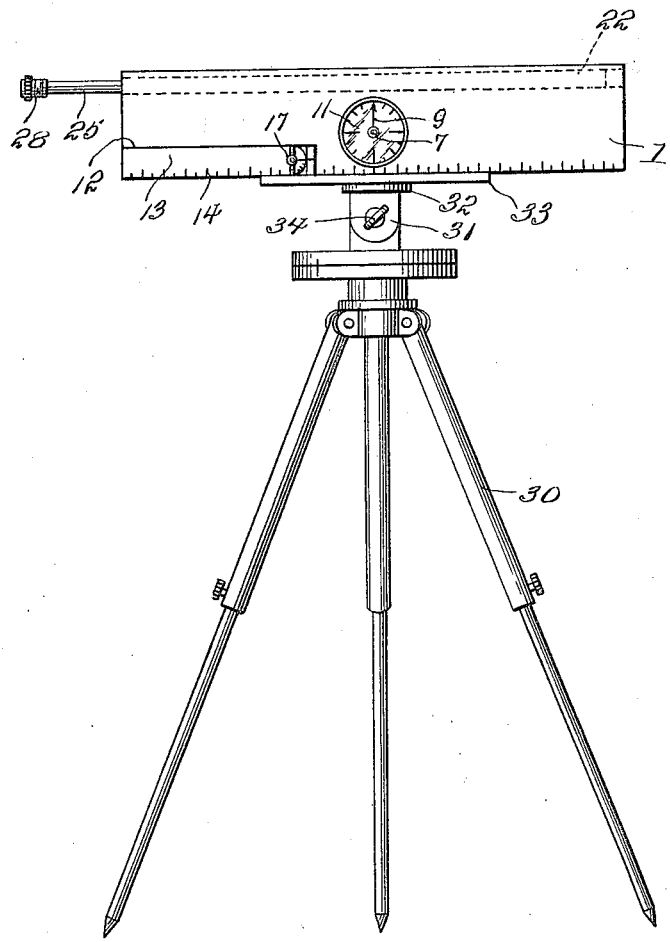
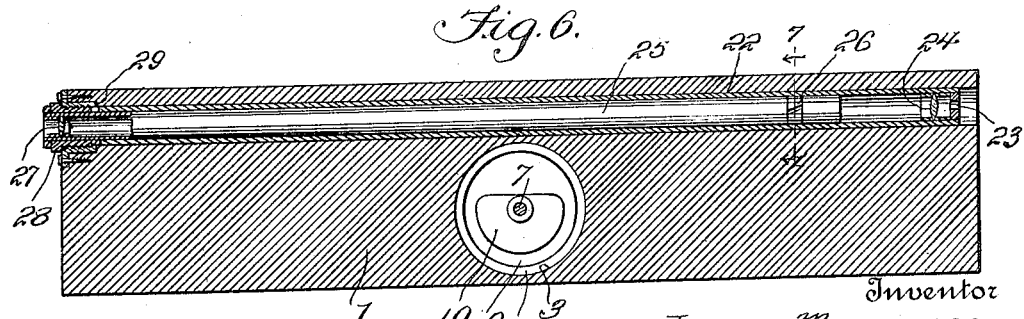

UNITED STATES PATENT OFFICE.

JAMES MAZZACCO, OF GALLUP, NEW MEXICO.

LEVELING AND MEASURING INSTRUMENT.

1,383,960. Specification of Letters Patent. Patented July 5, 1921.

Application filed July 22, 1918. Serial No. 246,070.

*To all whom it may concern:*

Be it known that I, JAMES MAZZACCO, a citizen of the United States, residing at Gallup, in the county of McKinley and State of New Mexico, have invented new and useful Improvements in Leveling and Measuring Instruments, of which the following is a specification.

This invention relates to a combined leveling and measuring instrument, and resides in the construction, combination and operative arrangement of parts set forth in the following description and falling within the scope of what is claimed.

In the drawings:

Figure 1 is a view of the improvement mounted on a tripod, showing the device in use for leveling;

Fig. 2 is a perspective view of the improvement;

Fig. 3 is an elevation showing the device when employed as a square or bevel, the dotted lines showing the blade in various positions;

Fig. 4 is a sectional view approximately on the line 4—4 of Fig. 3;

Fig. 5 is a detail sectional view approximately on the line 5—5 of Fig. 2;

Fig. 6 is a sectional view approximately on the line 6—6 of Fig. 2;

Fig. 7 is a fragmentary sectional view on the line 7—7 of Fig. 6;

Fig. 8 is a detail elevation illustrating the graduations on the inner rounded end of the blade.

Referring now to the drawings in detail, the numeral 1 designates the stock of the improvement which may be of any desired length to permit of an easy conveyance thereof by the operator. In the showing of the drawing the stock is of a two-foot length, and has its edges divided into inch marks and into fractions thereof. The stock 1 is preferably constructed of wood, but may, of course, be formed of other material.

The stock, at its center, and upon one of its sides is provided with a round depression 2 having an inner shoulder 3, and upon this shoulder is secured a compressible ring 4. The rear wall of the depression has secured thereon a circular plate 5 having a central opening 6, and this opening provides a bearing for one end of a shaft 7. The other end of the shaft projects through a disk or circular plate 8 which is seated upon the compressible ring 4 and secured, in any desired or preferred manner to both the ring and the shoulder 3. The plate or disk 8 is in the nature of a dial, being peripherally inscribed with the degrees of a circle, and on the outer end of the shaft 7 is secured an indicator finger 9. The shaft 7, at the portion thereof between the plate and the dial is weighted from one of the sides thereof, as indicated by the numeral 10, whereby, when the stock is held in a perfectly level position the hand 9 will point to the zero mark on the dial and also whereby, when the stock is held at an inclination the hand will indicate the degree of such inclination on the dial. The dial 8 and the hand 9 are preferably covered by a transparent disk 11 which is secured in the outer end of the depression 2 in any desired or preferred manner. The transparent disk 11 is preferably disposed a slight distance inward of the depression 2, so that the same will not be contacted when the stock is laid on one of its sides.

The stock, at a suitable distance to one side of the dial 8, and from one of the corners thereof has one of its sides provided with a substantially rectangular depression 12, the same forming a pocket for a blade 13, the said blade being graduated as at 14, and these graduations agree with the inch marks and fractions thereof on the stock. The inner end of the blade 13 is rounded, as at 15 and said inner end is provided with an opening through which passes a threaded member 16, the latter being engaged by a wing nut 17. When the stock is constructed of wood, as disclosed by the drawings, the bolt 16 may be formed upon the inner flat face of a metal plate 18 which is let in a suitable slot or depression in the inner wall of the pocket for the blade at the inner end of the said pocket, and the plate 18 is provided, at its inner end with an angle flange 19, and one of the edges of the blade 13 will contact with the inner face of this flange when the blade is brought at a right angle with respect to the stock 1.

Preferably the blade 13 at the rounded end 15 thereof is partially inscribed with the degrees of a circle, as indicated by the numeral 20 and the outer edge of the flange 19 has a single mark or line 21 arranged in a line with the center of the pivot of the blade 13, and whereby any of the indicating marks on the blade, when brought to aline with the mark 21 permits of the operator properly observing the degree of inclination of the blade with respect to the stock.

The stock is provided, adjacent one of its ends, below the degree of inclination of the indicator with the centrally arranged round opening within which is rigidly positioned a tube 22. The tube may have one of its ends arranged a slight distance inwardly of one of the ends of the stock 1, and this end of the tube is closed but is provided with a centrally reduced opening 23 covered by a glass 24. Telescopically received in the tube 22 is a second tube 25, suitable compressing means 26 being arranged between the tubes 22 and 25 to permit of the tube 25 being held when drawn outwardly of the tube 22. The tube 25, at the outer end thereof is provided with the usual glass 27 and upon its outer end is a revoluble threaded collar 28 which is held in a suitable manner against longitudinal movement but which is designed to engage threads in the longitudinal opening or any suitable bushing 29 provided in the end of the said opening, whereby the tube 25 may be locked when telescoped in the tube 22. The tubes are employed for leveling purposes, and as disclosed in Fig. 1 the device, when employed for leveling is supported on a tripod 30 having a swiveled element 31 on the top or table thereof, the said element being connected with a staff or standard 32 having its outer end provided with a substantially rectangular plate 33 that provides a support for the stock 1. Any desired or preferred means may be employed for securing the stock on the plate 33, and binding means 34 are provided between the elements comprising the swivel between the table and the staff or standard 32.

It is believed, from the foregoing description when taken in connection with the drawings that the simplicity of the construction and the advantages of the device will be apparent without further detailed description.

Having thus described the invention, what is claimed as new, is:—

In a device for the purpose set forth, a graduated stock having a degree indicator centrally thereof and a longitudinally extending round opening therethrough adjacent one of the edges thereof, a tube having one of its ends arranged a slight distance inwardly of the opening at one end of the stock, said tube having a closed end provided with a central opening, a second tube telescopically received in the first mentioned tube, compressing means between the tubes for frictionally holding one of the tubes when withdrawn through the other tube, a collar in the opening surrounding the outermost tube and providing a locking means for the said tube, all as and for the purpose set forth.

In testimony whereof I affix my signature.

JAMES MAZZACCO.